Oct. 19, 1971  D. W. CROSBY  3,613,190
NONWOVEN FABRICS AND A PROCESS FOR MAKING THEM
Filed July 13, 1970  5 Sheets-Sheet 4

Inventor
DAVID WINSTON CROSBY

By
Cushman Darby & Cushman
Attorneys

Inventor
DAVID WINSTON CROSBY

By
Cushman, Darby & Cushman
Attorneys

United States Patent Office 3,613,190
Patented Oct. 19, 1971

3,613,190
NONWOVEN FABRICS AND A PROCESS
FOR MAKING THEM
David Winston Crosby, Cwmbran, England, assignor to Imperial Chemical Industries Limited, London, England
Continuation-in-part of abandoned application Ser. No. 578,637, Sept. 12, 1966. This application July 13, 1970, Ser. No. 54,121
Claims priority, application Great Britain, Sept. 13, 1965, 38,990/65
Int. Cl. D04h 18/00
U.S. Cl. 28—4 R     8 Claims

ABSTRACT OF THE DISCLOSURE

A process for making a non-woven fabric having a predetermined repeating pattern of closely spaced tufts by the technique of moving a fibrous assembly along a path which is in the plane of the assembly and needle punching the assembly, said method comprising: arranging a plurality of pattern-forming punching needles in each of a plurality of sets and spacing the sets along the path of travel of the assembly, each set containing only a proportion of the total number of needles necessary to produce the predetermined tuft pattern; driving said needles into the fibrous assembly to produce a number of tufts less than the total number required for the pattern; forwarding the assembly along said path a distance such that each needle set will penetrate the assembly to form additional tufts which with the tufts inserted by a preceding needle set will form at least a part of the pattern; driving said needles into the assembly to form said additional tufts; and repeating the forwarding and needle driving steps whereby the tuft pattern is gradually built up.

---

This application is a continuation-in-part of my application, Ser. No. 578,637, filed Sept. 12, 1966, now abandoned.

The invention relates to a process and apparatus for making a non-woven fabric having a repeating pattern of tufts. It is known to produce tufted non-woven fabrics by needling non-woven fibrous assemblies or webs in a needle loom and it is also known to needle in ways which produce patterns of tufts. One such way is to use arrangements of needles having different lengths or arranged at selected spacings in the needle board of a needle loom but, because of the nature of a simple needle loom, such arrangements give simple patterns of tufts lying in continuous stripes along the length of the fabric. A method of producing more complex patterns of tufts is to traverse the needle board between needle penetrations of the web in a horizontal direction at right angles to the direction of travel of the web through the needle loom. By this method, a repeat pattern of, for instance, diamond shapes, can be produced. Such a method, however, involves the use of relatively complicated equipment to traverse the needle board. Yet another method involves the use of needles arranged in particular patterns in the needle board and advancing the web between machine punches by a distance equal to the length of the needle board in the direction of travel of the web, so that the patterned portion of the web is removed from the needle loom and, on the next penetration, the needles encounter a fresh surface of web. This method suffers from the disadvantage that if a closely spaced pattern of tufts is desired the closely spaced needles being inserted into the web all at the same time tend to cut through the fibrous assembly rather than merely punching tufts, as is desired.

I have now developed a process for producing a repeating pattern of tufts without traversing the needleboard and without cutting through the fibrous assembly and, accordingly, the invention provides a process for making a non-woven fabric having a predetermined repeating pattern of closely spaced tufts by the technique of moving a fibrous assembly along a path which is in the plane of the assembly and needle punching the assembly, said method comprising: arranging a plurality of pattern-forming punching needles in each of a plurality of sets and spacing the sets along the path of travel of the assembly, each set containing only a proportion of the total number of needles necessary to produce the predetermined tuft pattern; driving said needles into the fibrous assembly to produce a number of tufts less than the total number required for the pattern; forwarding the assembly along said path a distance such that each needle set will penetrate the assembly to form additional tufts which with the tufts inserted by a preceding needle set will form at least a part of the pattern; driving said needles into the assembly to form said additional tufts; and repeating the forwarding and needle driving steps whereby the tuft pattern is gradually built up.

In another of its aspects the invention comprises apparatus for making a non-woven fabric having a repeating pattern of tufts comprising: means for forming a non-woven web; a needle board movable only in a vertical direction, containing pattern-forming and non-pattern-forming needles and the pattern-forming needles being of different length to the non-pattern-forming needles; means for causing the needles to intermittently penetrate the non-woven web thereby effecting intermittent needling operations and means for advancing the non-woven web between at least some of the needling operations characterised in that the pattern-forming needles are arranged so that a repeat pattern is gradually built-up with successive needle penetrations.

The needle board may contain only one row of pattern forming needles or a number of rows extending along the needle board in the direction of travel of the web, the particular arrangement depending on the size of the desired pattern. In the latter case it becomes necessary to ensure that the incremental forwarding of the web bears the correct relationship to the spacing between the rows of pattern-forming needles.

It may be desirable, in order to obtain certain effects, to allow the needles to penetrate the non-woven web several times whilst maintaining the web stationary with respect to the needle board. In this way larger tufts may be obtained than those produced by a single penetration of the web.

The appearance of a row of pattern-forming needles will generally show a series of sets of needles, each set containing one or more needles and containing only a proportion of the total number of pattern-forming needles necessary to produce the required pattern. The pattern produced depends upon the spacing of the needles, the rate of needling and the speed of travel of the web through the needle loom and these must be carefully matched so that the desired pattern is gradually inserted by successive strokes of the needle loom. The web may be advanced intermittently through the needle loom a defined distance between punches or may travel continuously at a defined rate.

The pattern-forming needles may be the only needles in the needle board or the needle board may contain pattern-forming and other needles, the pattern-forming needles being of a different length or shape or having a different spacing to the other needles.

Among the factors which determine the tuft height in addition to multiple punching of the web without moving it, are the dimensions of the needle itself. Thus the length, thickness, shape of the blade portion (for example, circular, square or triangular) type, particularly the profile, of the barbs on the needle and their number, must all be borne in mind. When pattern-forming needles and other needles are used, the pattern-forming needles are chosen so that they produce different types of tufts to the remainder and/or are spaced differently to the remainder of the needles. The use of pattern-forming and other needles prevents distortion of the web between the pattern-forming needles which we have found occurs with certain patterns and webs when only pattern-forming needles are used.

The fibrous web may be composed of any conventional textile fibre, which term includes filaments and embraces both staple fibres and continuous filaments, and the fibres may be natural, man-made or any mixture of such fibres.

The man-made fibres may be homogeneous, or multicomponent in nature and in the latter case the multicomponent fibres conveniently comprise at least two synthetic polymer components at least one of which can be rendered adhesive under conditions which leave the other component or components substantially unaffected, the potentially adhesive component occupying at least a portion of the peripheral area of the fibre or filament. The incorporation of multicomponent fibres of this type permits the tufts to be set in a convenient and efficient manner, as a result of what is in essence an in situ development of a bonding agent through the activation of a potentially adhesive component. The activation of the potentially adhesive component may be accomplished without destruction of the fibrous character of the filament, for the activated component is maintained in contiguous association with the absence of adhesive from the bulk of the structure is believed to be of importance in properties such as tuft definition and retention, properties which contribute towards determining the permanance of the pile surface, and also the dyeability of the resulting pile fabric. In addition, the use of such filaments allows precise control of the quantity of binder and uniform disposition throughout the fibrous web to be readily attained.

If the components of the multicomponent fibre are in a side-by-side or eccentric arrangement then the tufts may be made to crimp after needling by a suitable treatment. Alternatively if crimp is not desired in the tufts the components of the filament can be produced in a symmetrical sheath-core arrangement with the potentially adhesive component in the sheath. In practice it is very difficult to obtain an absolutely symmetrical sheath and core heterofilament and some crimp, albeit very slight, is nearly always present after bonding this type of multicomponent filament.

The relative amounts of the adhesive and non-adhesive components constituting the heterofilaments can be varied to suit the type of pile fabric required, having regard to the physical properties desired therein.

The fibrous assembly may be fabricated in a number of ways, and the method selected in a particular instance, depends to a very large extent on the length of fibres when fibres other than continuous filaments are used. Staple fibres, continuous filament and continuous filament yarn webs are all suitable for use in the present invention.

When the fibres of the assembly are simple, one component fibres, i.e. homofilaments, it is often advantageous after tufting to bond fibres in the assembly to set the fibre tufts and generally make the assembly more stable by use of an adhesive. The adhesive may be an aqueous or non-aqueous solution, emulsion or dispersion of an adhesive or of a potentially adhesive material which, upon curing, forms adhesive bonds. As examples of suitable adhesives there may be mentioned rubber (natural or synthetic), polyurethanes, polyvinyl resins such as polyvinyl acetate polyvinyl alcohol and polyvinyl chloride, and polyamide resins.

The adhesive may be applied in a liquid form or as a foam.

The adhesive may take the form of a solid bonding agent incorporated in the fibrous assembly as a powder or in fibrous form, the bonding agent being potentially adhesive under conditions which do not effect fibres of the assembly. For example, the bonding agent may have a softening point below that of fibres present in the assembly and hence can be rendered adhesive i.e. activated by heat or by some suitable chemical means.

It is not necessary to carry out the process of this invention with single fibrous assemblies. The assembly may be made up of a number of individual fibrous assemblies which may or may not have already been subjected to a needling action before the processes of this invention are performed on them. Thus, for example, a fibrous assembly may already have a tufted surface and then have another fibrous assembly needled through it according to any of the processes of this invention and depending on the height of the tufts inserted by the latter needling operation the surface of the combined assembly will contain tufts of say two different heights or say tufts all of the same height but with discrete areas of the assembly having a greater density of tufts than others.

The fibrous assembly may also incorporate reinforcing members such as scrim fabrics to provide the structure with more strength or thermoplastic sheets which are subsequently agglutinated to provide a bonding agent in the assembly.

The invention is further described with reference to the accompanying drawings in which FIG. 1 is a diagrammatic perspective view sequentially illustrating one embodiment of the process of this invention and showing the apparatus employed;

FIG. 2 is a perspective view of two different needles which may be used to insert tufts of different heights in products made by the process of this invention:

FIGS. 3–6 illustrate the general manner in which pattern-forming needles are arranged in a needle-board to perform the process of my invention: FIG. 3 showing a repeat pattern, FIG. 4 a plan of a typical needle-board, FIG. 5 the pattern of tufts obtainable with the needle-board of FIG. 4 most closely corresponding to the desired pattern of FIG. 3, and FIG. 6 showing an arrangement of pattern-forming needles in the needle board which will produce the pattern of FIG. 5;

Figure 1:
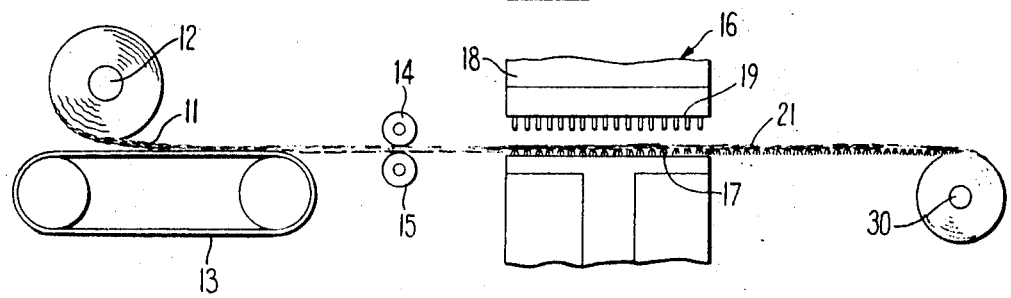

In practising the present invention with the apparatus of FIG. 1, an assembly 11 of relatively loosely associated fibres is advanced from a supply roll 12 onto an endless continuously moving conveyor belt 13 and passed into the nip between two rolls 14 and 15. A carding, garnetting or air-laying machine, or indeed any means for forming an assembly of relatively loosely associated fibres may take the place of the supply roll 12. From the rollers 14 and 15 the fibrous assembly is passed into, and through a single bed needle loom 16 of conventional design. The needle loom comprises a horizontal surface formed by a bed plate 17 which supports the fibrous assembly as it passes through the loom and cross-head 18 carrying a removable needle board 19.

The cross-head 18 reciprocates vertically and moves the needles which are located in holes in the board in and out of the fibrous assembly. In their passage into the assembly, the barbs of the needle engage fibres and carry them through the assembly so that they are reoriented into the thickness direction thereof.

Figure 2:
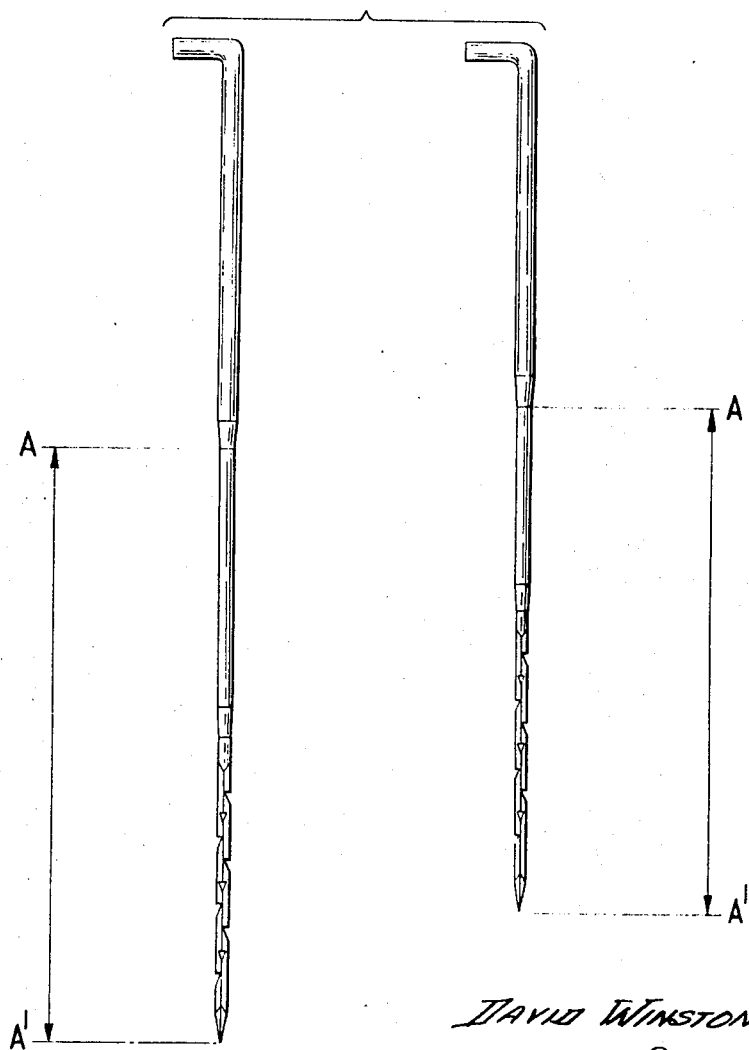

FIG. 2 shows two needles, one long and one short, which may be used to insert tufts of different heights. The dimensions of these needles and details of construction are as follows:

|  | Long needle | Short needle |
| --- | --- | --- |
| Metal | Mild steel | Mild steel. |
| Overall length | 3½" | 3". |
| Length of blade (A–A') | 2.2" | 1.8". |
| Shape of blade | Triangular | Triangular. |
| Diameter of blade | 25 gauge | 32 gauge. |
| Type of barb | Standard with regular spacing. | Standard with regular spacing. |
| Number of barbs | 9 | 9. |

Figure 3:
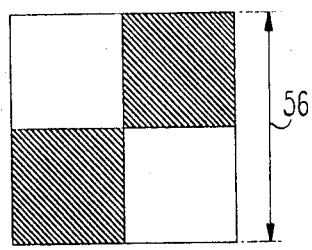

The arrangement of pattern-forming needles in the needle board in accordance with my invention can be accomplished in a number of ways, but the general sequence is that illustrated by way of example with reference to FIGS. 3–6. FIG. 3 illustrates a typical repeat pattern of tufts which it is desired to reproduce on a non-woven fabric. The shaded areas indicate areas in which tufts are present and the unshaded areas indicate areas which, although possibly needled, are not tufted. The arrow 56 in FIG. 3 indicates the direction of the length of the material and only a part of the material in the widthwise direction is shown for simplicity.

Figure 4:
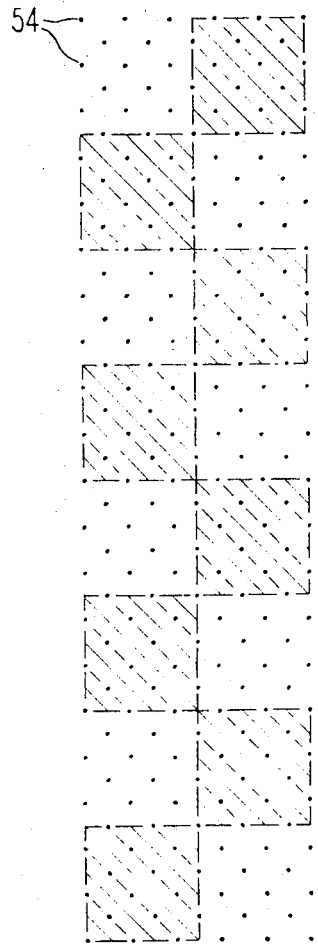

FIG. 4 shows schematically, on the same scale as FIG. 3, a plan of a typical needle board: dots 54 indicate positions which may be occupied by needles. The entire needle board is shown in the lengthwise direction, but only the relevant portion, required to produce the repeat pattern is shown in the widthwise direction. Shaded areas 50 show the repeat pattern of FIG. 3 superimposed upon the plan of needle board.

Figure 5:
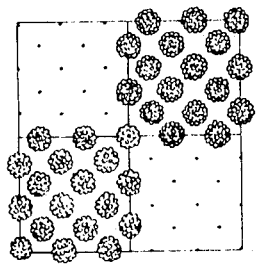

FIG. 5 shows the pattern of tufts that corresponds most closely to the desired repeat pattern.

Figure 6:
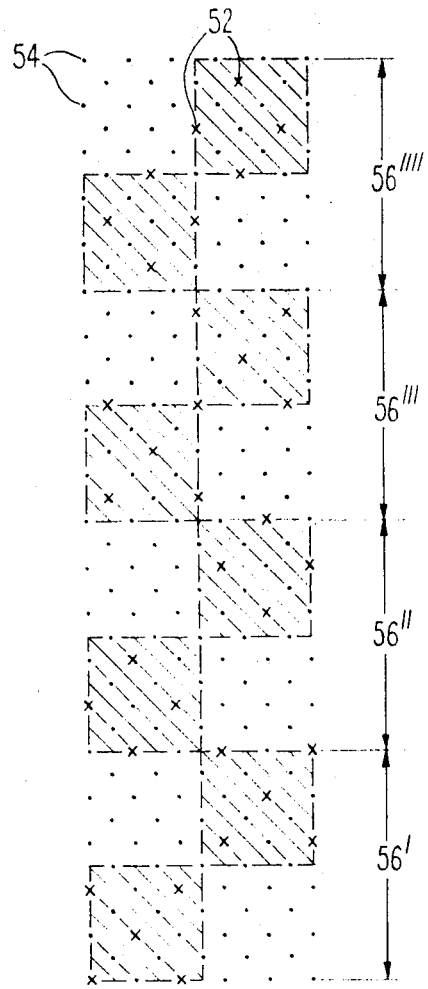

In FIG. 6 pattern-forming needles are indicated by crosses 52 and other positions are shown by dots 54. Positions 54 may be occupied by non-pattern-forming needles or may be left vacant as desired. The arrangement of the pattern-forming needles indicated by reference numeral 52 is chosen so that no two adjacent tufts in the desired pattern are produced at the same instant. The pattern-forming needles will be seen to be arranged in four sets: Arrows 56 indicate the length of each set of needles and consequently correspond to the distance of advance of the web in order to produce the desired pattern: integration of the patterns of pattern-forming needles shown in sections 56', 56'', 56''' and 56'''' of FIG. 6 will be seen to correspond to the desired pattern shown in FIG. 5.

Figure 7:
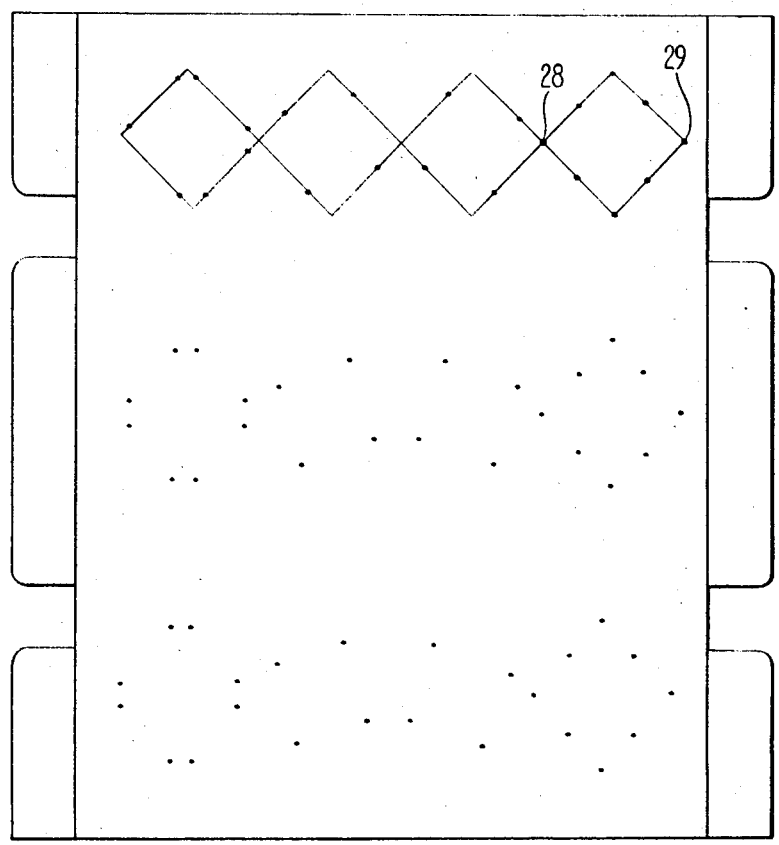
FIG. 7 is a plan view of a needle board according to the invention which will produce a diamond pattern.
Figure 8:
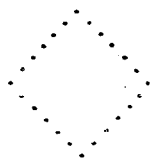
FIG. 8 is a plan representation of a diamond pattern of tufts produced when a fibrous web has been passed through a needle loom containing the board shown in FIG. 7.

FIG. 7 shows a board designed to produce a diamond pattern of tufts with each side of the diamond having 7 tufts as shown in FIG. 8. To prevent the assembly being ripped on entry of the needles, the needles are arranged in four sets spaced along the path of travel of the web, each set of needles containing only a proportion of the total number of pattern-forming needles, so that the pattern is produced in four stages with only a proportion of the tufts being inserted in each stage. The needles are spaced as shown such that adjacent tufts are never inserted in the same punch thus reducing the probability of ripping. In order to produce the diamond pattern the assembly must be advanced by an amount equal to the distance between needles 28 and 29 between each punch and four punches of the board will be necessary to produce the complete pattern.

Figure 9:
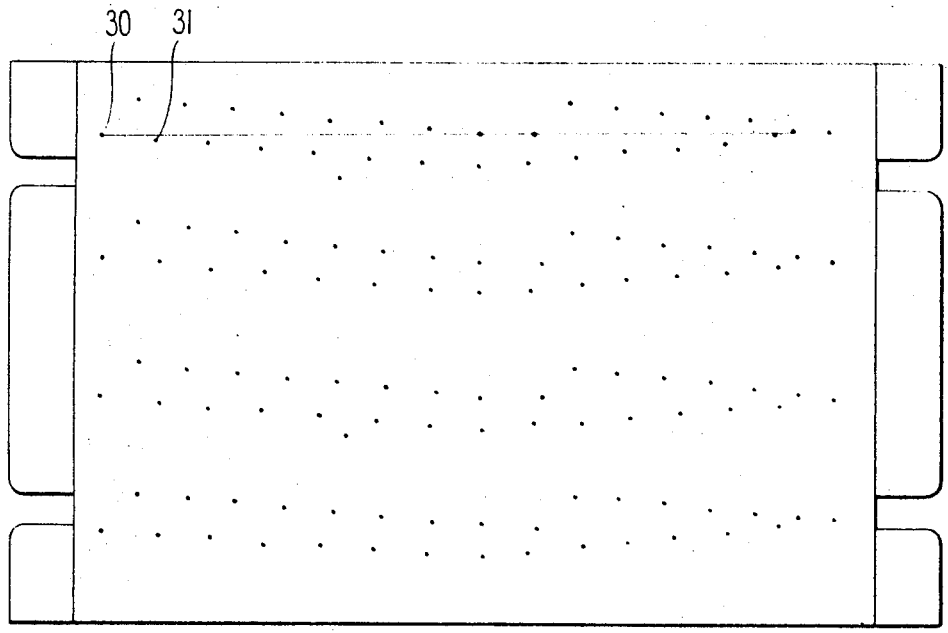
FIG. 9 is a plan view of a needle board according to the invention which will produce an arrow head pattern.
Figure 10:
FIG. 10 is a plan representation of an arrow head pattern of tufts produced when a fibrous web has been passed through a needle loom containing the board shown in FIG. 9.

FIG. 9 shows another needle board and arrangement of needles designed to produce an arrowhead pattern of tufts as shown in FIG. 10. The needles, such as needles 30 and 31 are distributed along the needle-board as shown in FIG. 9 such that no ripping of the fibrous assembly occurs and the assembly is forwarded by a calculated amount, in this case slightly less than the distance between needles 30 and 31, between each punch of the board.

Figure 11:
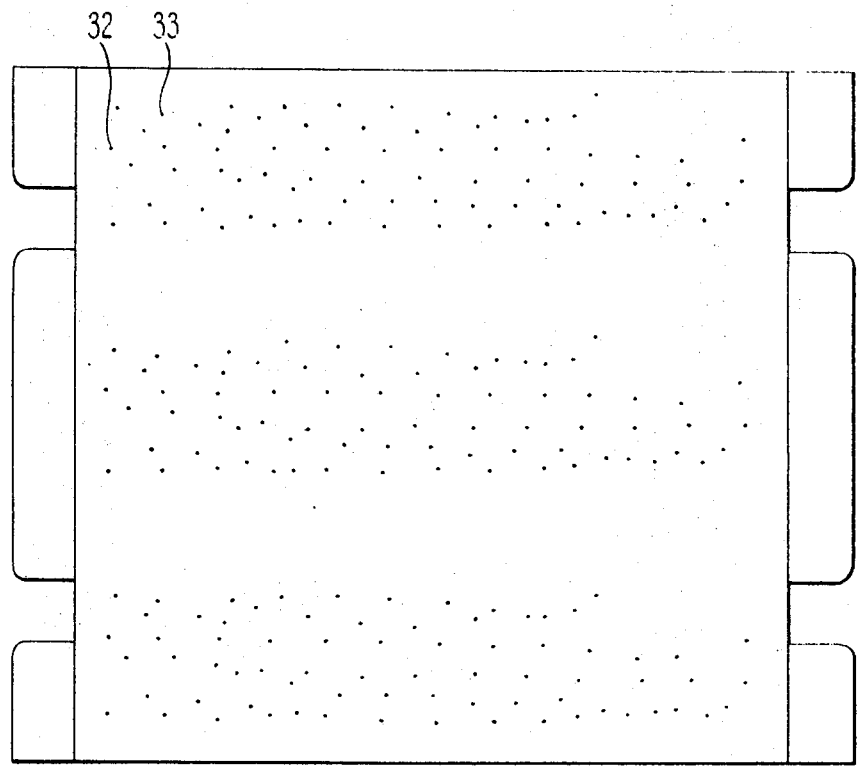
FIG. 11 is a plan view of a needle board according to the invention which will produce a pattern of tufts showing the letters B.N.S.
Figure 12:
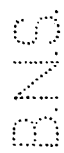
FIG. 12 is a plan representation of a pattern of tufts showing the letters B.N.S. which has been produced when a fibrous web has been passed through a needle loom containing the board shown in FIG. 11.

FIG. 11 shows another needle board and arrangement of needles designed to produce a pattern of tufts of the letters B.N.S. as shown in FIG. 12. The needles, such as needles 32 and 33, are distributed along the needle board as shown in FIG. 11 such that no ripping of the fibrous assembly occurs and the assembly is forwarded by a calculated amount, in this case slightly less than the distance between needles 32 and 33, between each punch of the board. The following examples are further illustrative of the aspects of this invention but are in no way limitative of the scope thereof:

EXAMPLE 1

A 12 oz. per sq. yard staple web containing equal proportions by weight of 12 denier, 2½" staple bi-component fibres comprising poly(hexamethylene adipamide) as one component and 80/20 random copolymer of poly(hexamethylene adipamide)/poly(epsilon caprolactam) as the other component, the two components being present in equal proportions by volume and in a side-by-side relationship and 15 denier, 2½" black trilobal staple fibres of poly(hexamethylene adipamide) was made on a Proctor and Schwartz air laying machine, the web was then needle punched to 300 p.p.s.i. in one direction using 25 gauge, 3½" needles, punching to five-eighths of an inch, then sintered in a conveyorised oven at 240° C.

Hessian of 9 oz. per sq. yard was laid on the product, then a 6 oz. per sq. yard web, consisting of 12 denier, 2½" core/sheath heterofilament staple fibres was laid on top of the hessian, the core component of heterofilaments being poly(hexamethylene adipamide) and the sheath component being an 80/20 random copolymer of poly(hexamethylene adipamide)/poly(epsilon caprolactam), the ratio of core material to sheath material being approximately 75:25 by volume. The 6 oz. per sq. yard web was then needle punched through the hessian into the sintered material using 32 gauge, 3½" needles, punching at three-eights of an inch to 150 p.p.s.i. A needle board containing 25 gauge, 3½" needles, as set out in FIG. 7 of this specification, was then fitted to the needle loom. The sandwich construction was passed through the machine, with the 6 oz. per sq. yard web nearest the needles and, with the needles punching ⅝", the movement of the web through the loom between the punches was adjusted so that, on exiting the needle loom, the tufts were obtained in a diamond pattern, as shown in FIG. 8. A three-sixths of an inch foam backing was applied by foaming latex in situ and the resultant diamond pattern patterned material was suitable as a floor covering material.

EXAMPLE 2

A 5 oz. per sq. yard web containing equal proportions by weight of 9 denier 2½" staple fibres of poly(hexamethylene adipamide) and 6 denier 2¼" staple fibres of side-by-side heterofilaments similar to those used in Example 1 was made on a Proctor and Schwartz air laying machine. A second web consisting wholly of 6 denier 2¼" staple side-by-side heterofilaments similar to those used for the first web was air-laid to a weight of 5 oz. per sq. yard. This web was laid on top of the first web and the two were laid on top of a hessian fabric. This construction was needle punched with the webs nearest the needles in three passes through the needle loom to punch densities of 400, 300, and 200 p.p.s.i. 32 gauges standard barb needles were used punching to a depth of 7/16". A 1½ oz.

per sq. yard web of spun coloured side-by-side heterofilaments similar to those used in the other webs was laid on top of the composite material and punched through the composite material to a depth of ½″ using a needle board as shown in FIG. 9. The material was forwarded between successive strokes of the needle board by a calculated amount, in this case slightly less than the distance between needles 30 and 31 in FIG. 9.

The composite fabric was passed through a conveyorised oven and the fabric removed from the hessian and dyed. A patterned moquette-like material was produced with a pattern as shown in FIG. 10.

EXAMPLE 3

An 8 oz. per sq. yard web of 12 denier 6″ staple heterofilaments, the two components of which were present in equal amounts and arranged in side-by-side relationship, with one component being poly(hexamethylene adipamide) and the other component being an 80/20 random copolymer of poly(hexamethylene adipamide)/poly(epsilon caprolactam) was made on a Proctor and Schwartz air laying machine and given a random needle punching treatment using 32 gauge needles to a punch density of 300 punches per sq. inch, and a punching depth of ½″. A second air laid web of heterofilaments similar to those in the first one, but having a denier of 6 and a length of 2¼″ and a modified dye uptake was made to a weight of 2 oz. per sq. yard. The 2 oz. per sq. yard web was punched through the 8 oz. per sq. yard web, using 32 gauge standard barb needles arranged in a board as shown in FIG. 11, the composite structure being advanced by a calculated amount, in this case slightly less than the amount between the needles 32 and 33, between successive strokes of the needles. The product was fused in an air oven at 230° C., then dyed, dried and adhesively bonded to hessian to give a material showing the letters B.N.S. as a tufted pattern.

I claim:

1. A process for making a non-woven fabric having a predetermined repeating pattern of closely spaced tufts by the technique of moving a fibrous assembly along a path which is in the plane of the assembly and needle punching the assembly, said method comprising: arranging a plurality of pattern-forming punching needles in each of a plurality of sets and spacing the sets along the path of travel of the assembly, each set containing only a proportion of the total number of needles necessary to produce the predetermined tuft pattern; driving said needles into the fibrous assembly to produce a number of tufts less than the total number required for the pattern; forwarding the assembly along said path a distance such that each needle set will penetrate the assembly to form additional tufts which with the tufts inserted by a preceding needle set will form at least a part of the pattern; driving said needles into the assembly to form said additional tufts; and repeating the forwarding and needle driving steps whereby the tuft pattern is gradually built up.

2. A process as in claim 1 wherein the fibrous assembly is penetrated only by said pattern-forming needles.

3. A process as in claim 1 wherein at least one of the sets of needles includes non-pattern-forming needles of different length than the pattern-forming needles.

4. A process as in claim 1 wherein at least one of the sets of needles includes non-pattern-forming needles of different shape than the pattern-forming needles.

5. A process as in claim 1 wherein at least one of the sets of needles includes non-pattern-forming needles which are differently spaced than the pattern-forming needles.

6. A process as in claim 1 wherein the needles penetrate the fibrous assembly a plurality of times between the successive forwarding steps.

7. Apparatus for making a non-woven fabric having a repeating pattern of tufts comprising: means for forming a non-woven web; a needle board movable only in a vertical direction, containing pattern-forming and non-pattern-forming needles and the pattern-forming needles being of different length to the non-pattern-forming needles; means for causing the needles to intermittently penetrate the non-woven web thereby effecting intermittent needling operations; and means for advancing the non-woven web between at least some of the needling operations characterised in that the patern-forming needles are arranged so that a repeat pattern is gradually built-up with successive needle penetrations.

8. Apparatus as claimed in claim 7, characterised in that the pattern-forming needles have different spacings to the non-pattern-forming needles.

References Cited

UNITED STATES PATENTS

| | | | |
|---|---|---|---|
| 2,132,530 | 10/1938 | Greiser | 28—4 |
| 2,970,365 | 2/1961 | Morgenstern | 28—72.2 X |
| 3,347,736 | 10/1967 | Sissions | 161—67 |
| 3,348,993 | 10/1967 | Sissions | 161—67 |

LOUIS K. RIMRODT, Primary Examiner

U.S. Cl. X.R.

28—72.2